United States Patent [19]

Aida et al.

[11] Patent Number: 5,653,932
[45] Date of Patent: Aug. 5, 1997

[54] INJECTION MOLDING METHOD FOR PREVENTING FORMATION OF SURFACE DEFECTS AND MOLD ASSEMBLY THEREFOR

[75] Inventors: Hiroshi Aida, Kawasaki; Haruhiko Yoshizaki, Hadano; Takamitsu Hosoyama, Hachiohji, all of Japan

[73] Assignee: Nippon Steel Chemical Co., Ltd., Tokyo, Japan

[21] Appl. No.: 464,870

[22] PCT Filed: Dec. 17, 1993

[86] PCT No.: PCT/JP93/01830

§ 371 Date: Jun. 28, 1995

§ 102(e) Date: Jun. 28, 1995

[87] PCT Pub. No.: WO94/14592

PCT Pub. Date: Jul. 7, 1994

[30] Foreign Application Priority Data

Dec. 28, 1992 [JP] Japan ................... 4-361177
Aug. 23, 1993 [JP] Japan ................... 5-207770

[51] Int. Cl.$^6$ ............... B29C 45/37; B29C 33/40; B29C 45/26
[52] U.S. Cl. ............ 264/219; 249/114.1; 249/134; 264/327; 264/328.12; 264/328.16; 264/338; 425/542
[58] Field of Search .............. 264/219, 327, 264/328.1, 328.12, 328.16, 338; 249/111.79, 114.1, 134; 425/542, 552

[56] References Cited

U.S. PATENT DOCUMENTS

| | | | |
|---|---|---|---|
| 3,734,449 | 5/1973 | Itou et al. | 249/114.1 |
| 4,225,109 | 9/1980 | Yotsutsuji et al. | 249/114.1 |
| 5,020,770 | 6/1991 | Moberg | 249/111 |
| 5,362,226 | 11/1994 | Kataoka et al. | 249/111 |
| 5,458,818 | 10/1995 | Kim et al. | 249/114.1 |
| 5,468,141 | 11/1995 | Iwami et al. | 249/114.1 |

FOREIGN PATENT DOCUMENTS

| | | |
|---|---|---|
| 489335 | 12/1990 | European Pat. Off. . |
| 437345 | 7/1991 | European Pat. Off. . |
| 54-142266 | 11/1979 | Japan . |
| 55-55818 | 4/1980 | Japan . |
| 55-55839 | 4/1980 | Japan . |
| 60-113930 | 6/1985 | Japan . |
| 61-79611 | 4/1986 | Japan . |
| 10829 | 11/1989 | WIPO . |

*Primary Examiner*—Jill L. Heitbrink
*Attorney, Agent, or Firm*—Webb Ziesenheim Bruening Logsdon Orkin & Hanson, P.C.

[57] ABSTRACT

A mold 11 having an inner surface coated with a heat insulating film 14 excellent in heat insulation and conformability to a molten resin 20 is clamped with the other mold 12 to form a molding cavity 13. When the molten resin 20 is cooled and solidified in the cavity 13, heat transmission through the mold 11 is suppressed by the film 14 so that a skin layer 23 preferentially grows at the side of the mold 12. Hence, the volumetric shrinkage of the resin 20 during cooling and solidification is selectively absorbed in the deformation of the skin layer 23 separated from the inner surface of the mold 12. As a result, an obtained product has a smooth front surface free from defects such as sink marks. The heat insulating film 14 exhibits the effect to eliminate weld lines, too.

10 Claims, 5 Drawing Sheets

INJECTION MOLDING METHOD FOR PREVENTING FORMATION OF SURFACE DEFECTS AND MOLD ASSEMBLY THEREFOR

BACKGROUND OF THE INVENTION

The present invention relates to an injection molding method for manufacturing a product having the external appearance free from defects such as sink marks or weld lines. The present invention is also directed to a mold assembly suitable for manufacturing such a product.

According to a method of injection molding a thermoplastic resin, the product which even has a complicated profile can be easily manufactured with high productivity. In this regard, the injection molding process has been adopted in various field, e.g. for manufacturing industrial parts or living necessaries.

A molten resin to be injection molded is forcibly poured through a gate into a molding cavity defined in a mold assembly. The poured resin passes through a predetermined channel to fill the cavity. The resin is diverged to a plurality of flows and then joined together during the fluidization in the cavity. When a plurality of the resin flows are incompletely joined together at the confluent point in the cavity, the incomplete joining causes the formation of weld lines. Especially in the case of manufacturing a product having a complicated configuration, a plurality of gates are opened to the molding cavity. Consequently, weld lines are formed on the surface of the product with high frequency.

The molten resin poured in the molding cavity is cooled and solidified in the state to fill the cavity. The resin reduces its volume due to phase transformation or thermal shrinkage during the cooling and solidification. The volumetric shrinkage is not uniformly promoted in the resin body, but is likely to concentrate at a certain part. The uneven shrinkage causes the formation of defects such as sink marks on the surface of an obtained product.

The resin especially at the thick wall part, where cooling and solidification would be delayed due to mass effect, is held in a highly fluid state, although the resin at the surroundings has been already solidified. Consequently, a stress originated in the shrinkage of the resin at the surroundings is accumulated in the resin at the thick wall part, so that sink marks are concentratedly formed on both the surfaces of the thick wall part.

Such a thick wall part is effective in an obtained product, e.g. as a reinforcing rib or a boss for fixture maldistributed on the periphery or interior of the product, or an outer or inner frame. However, surface defects such as sink marks or weld lines formed at the thick wall part or its neighborhood remarkably reduces the commercial value of the product. In general, the sink marks becomes deeper as the thickness of the rib, the larger diameter of the boss or the higher temperature of the molten resin.

For instance, when a molten resin 20 is poured into a cavity 13 between a stationary mold 11 and a movable mold 12 as shown in FIG. 1, the fountain flow 21 from which the molten resin 20 continuously gushes out is formed at the top end of the molten resin 20 passing into the cavity 13. The fountain flow 21, after being sent to the top end of the molten resin 20, changes along the direction toward the inner surfaces of the molds 11, 12 and then arrives at parts near the inner surfaces, as shown as a resin flow unit 22 in FIG. 1. The resin 20 is rapidly cooled and solidified by thermal diffusion through the molds 11, 12, to form a skin layer 23 in contact with the inner surface of each mold 11, 12. The cooling and solidification of the resin 20 is interpreted from the movement of the resin flow unit 22 as such that the resin 20 is stretched longer near the inner surface of each mold 11, 12 and formed to the skin layer 23 orientated due to the stretching.

When the molding cavity 13 in the mold assembly is filled with the molten resin 20, the molten resin 20 stops its fluidization. The interior of the molten resin 20 in the stationary state is cooled through the molds 11, 12, so that the skin layer 23 grows up to a thick solidified layer along the direction from the inner surface of each mold 11, 12 to the interior of the resin 20. At the same time when the solidified layer is formed, the molten resin 20 reduces its volume. Consequently, the interior of the molten resin 20 becomes at a negative pressure. The word "skin layer" in the following explanation means one involving said solidified layer.

In case where there is a wall part having thickness larger than that of the surroundings, the cooling and solidification of the molten resin 20 at the thick wall part is delayed in comparison with the cooling and solidification of the molten resin 20 at the surroundings. Due to said delay, the shrinkage strain of the molten resin 20 at the surroundings is accumulated in the thick wall part, so that a fairly large negative pressure is formed at the thick wall part. Said negative pressure affects on the skin layer 23, which is still viscous, at the thick wall part. Either of the skin layers 23, which is softer or less adhesive to the inner surface of the mold 11 or 12, is peeled off the inner surface. As a result, the surface of the solidified resin body is depressed. Hereby, sink marks are formed on the surface of an obtained resin product.

An injection molded product is ordinarily used with its flat surface faced to a user. A skin layer 23 for forming the flat surface shrinks along the inner surface of a mold during cooling and solidification, so that the skin layer 23 is easily peeled off the inner surface. On the other hand, a skin layer 23 for forming the back side of the product is hardly peeled off the inner surface of the mold, since the back side has a complicated profile due to the formation of ribs and/or bosses. Hereby, the skin layers for forming the front and back surfaces exhibit adhesiveness different from each other to the inner surfaces of the molds. Due to said difference in adhesiveness, the skin layer for forming the front surface is preferentially pulled inwards by the negative pressure in the interior of the molten resin. Thus, sink marks are formed on the front surface of the product.

There have been proposed various injection molding methods belonging to a short-shot process accompanied with high-pressure gas assist, for manufacturing a product having a very thick wall part. According to the short-shot process, a molten resin is injected into a molding cavity in an amount insufficient to completely fill the cavity, and a high-pressure gas is forcibly injected into the cavity so as to form a hollow portion in the molten resin. The high-pressure gas may be simultaneously injected into the cavity with the molten resin. The injected molten resin is dwelled by the application of the gaseous high pressure through the hollow resin passage. Hereby, the resin is cooled and solidified in a state pressed onto the inner surface of the mold.

In order to realize the effect of the high-pressure gas application, there shall be provided a thick wall part communicating with a gas passage. Herein, there are restrictions on the designing of a product, e.g. the size and position of the thick wall part, especially when the product to be injection molded has a complicated configuration. In addition, said thick wall part acts as a flow leader for the molten resin, so as to destroy the injection balance of the resin with respect to the whole body of the product. As a result, surface defects such as air traps and flow marks are easily formed on the surface of the obtained product.

Besides, the short-shot process necessarily uses the high-pressure gas. The use of the high-pressure gas requires dangerous operations, difficult handling and a special expensive control system. Due to these defects, the short-shot process has not been developed to broad extents.

By the way, there have been proposed other methods for inhibiting surface defects such as sink marks and weld lines with ease.

For intance, Japanese Patent Application Laid-Open 56-167410 teaches a local heating method, wherein the back side of a mold is partially heated at a position easy to form sink marks. A molten resin in contact with the heated mold part is delayed in cooling and solidification from the other part. When the back side at the position easy to form sink marks is partially heated at a temperature higher than that of the mold, sink marks are formed on the back side of the product but not on its front surface. Hereby, the obtained product does not substantially reduce its commercial value due to the sink marks. However, the local heating of the mold causes the elongation of an injection molding cycle and additionally requires heating means.

Japanese Patent Application Laid-Open 61-9126 teaches the provision of a porous nozzle at the part of the back side easy to form sink marks. Compressed air is introduced through the porous nozzle into the cavity so as to press the back side of aresin body. The resin is cooled and solidified in the state tightly pressed onto the inner surface of the mold by the application of the compressed air. Hereby, an obtained product has a smooth surface without the formation of sink marks. However, the method requires a specially designed mold in which the nozzle made of a porous material can be installed. In addition, the injection of the compressed air through the porous nozzle requires additional equipment and put restrictions on the structure of the mold.

A molten resin poured into a molding cavity is diverged to a plurality of flows and then joined in response to the configuration of said cavity. When a plurality of the resin flows are joined together, their skin layers are fused to each other. If the skin layers are fixed without sufficient fusion, a weld line is formed at the joining position. The weld line reduces the commercial value of a product, too.

There have been also proposed several methods for reducing weld lines. For instance, heating and cooling means are provided at the parts of a mold easy to form weld lines, as disclosed in Japanese Patent Application Laid-Open 51-22759. The fusion of the skin layers to each other can be promoted by the application of a shearing force to a part of a molten resin in the cavity, as disclosed in Japanese Patent Application Laid-Open 3-274127. Said fusion may be promoted by the transmission of ultrasonic waves to a molten resin in a fluid state, as disclosed in Japanese Patent Application Laid-Open 4-90309. These methods effectively inhibit the formation of weld lines, but requies additional devices or equipment. In this respect, there is a strong demand for the practical method which can easily inhibit the formation of weld lines.

Japanese Patent Application Laid-Open 4-211912 discloses the injection mold which can simultaneously inhibit the formation of weld lines and flow marks. Said mold has an inner surface coated with a heat insulating layer. The layer has thickness of 0.5–50 μm, heat conductivity of 0.1 cal/cm·sec·° C. or less and an angle of contact with water not more than 30 degrees. The layer is made of a material such as metallic oxide, silicic oxide, silicic complex oxide and plasma-polymerized plastics.

When a molten resin injected into the molding cavity comes in contact with the heat insulating layer, the layer is instantaneously heated at a high temperature by a heat retained in the molten resin. The heated layer exhibits excellent wettability and conformability to the molten resin, so as to improve the transferring ability of the mold. Consequently, a product having the profile which accurately imitates the configuration of the molding cavity is obtained without the formation of weld lines or flow marks. However, the mold having the inner surface coated with the heat insulating layer does not have the effect to inhibit the formation of sink marks originated in the volumetric shrinkage of the molten resin during cooling and solidification.

In general, a molten resin injected into the molding cavity is rapidly cooled, just after it comes in contact with the inner surface of the mold. Hereby, a surfacial skin layer is formed on the surface part of the molten resin in contact with the inner surface of the mold. The cooling and solidification of the molten resin 20 continues while gradually thickening the surfacial skin layer inwards to the skin layer 23. Hereon, a negative pressure is formed in the interior of the molten resin 20 by the abrupt volumetric shrinkage which occurs at a glass-transition temperature. The negative pressure acts as the power to pull the skin layer 23 inwards shown by the arrows in FIG. 2, and becomes larger with the cooling and solidification of the molten resin 20. Once the negative pressure exceeds the self-supporting force of the skin layer 23, the skin layer 23 is peeled off the inner surface of the mold and pulled inwards. The resulting dent acts as a starting point for the formation of sink marks.

An object of the present invention is to adversely utilize the dent-forming phenomenon to obtain an injection molded product excellent in surface appearance.

Another object of the present invention is to provide a simplified method capable of inhibiting the formation of sink marks on the front surface of a product with ease, as well as the formation of weld lines caused by the joining of resin flows during the injection of a molten resin into a molding cavity.

SUMMARY OF THE INVENTION

According to the present invention, there is provided an injection mold assembly comprising a stationary mold and a movable mold. The inner surface of either the stationary mold or the movable mold, corresponding to the external appearance of a product, is coated with a heat insulating film excellent in wettability and conformability to a molten resin to be injected. The mold having the inner surface coated with said heat insulating film is clamped together with the other mold to define a molding cavity. A molten thermoplastic resin in a predetermined amount is injected into the cavity.

On the stage where the injected resin is cooled and solidified, the growth of a skin layer as well as the peeling of the skin layer are delayed near the inner surface of the mold coated with the heat insulating film. On the other hand, the molten resin is ordinarily cooled and solidified near the inner surface of the other mold uncoated with the heat insulating film, so that the skin layer is preferentially peeled off the inner surface early in the progress of the volumetric shrinkage of the resin. Thus, the preferential peeling of the skin layer absorbs the volumetric shrinkage of the resin being cooled and solidified, at the side of the other mold uncoated with the heat insulating film. Hence, the external appearance of the product is prevented from the formation of defects such as sink marks.

The heat insulating film formed on the inner surface of the mold exhibits a instantaneous heat insulating effect, when the molten resin is injected into the molding cavity. Owing to the heat insulating effect, a skin layer formed in contact with the inner surface of the mold is remelted by a heat retained in the molten resin. The remelting effectively eliminates weld lines. In addition, the heat insulating film does not have any harmful influences, e.g. the elongation of molding cycle, owing to its small heat capacity.

Other features of the present invention will be apparent in the following description with reference to the drawings.

DETAILED DESCRIPTION OF THE PREFERRED EMBODIMENTS

Figure 1:
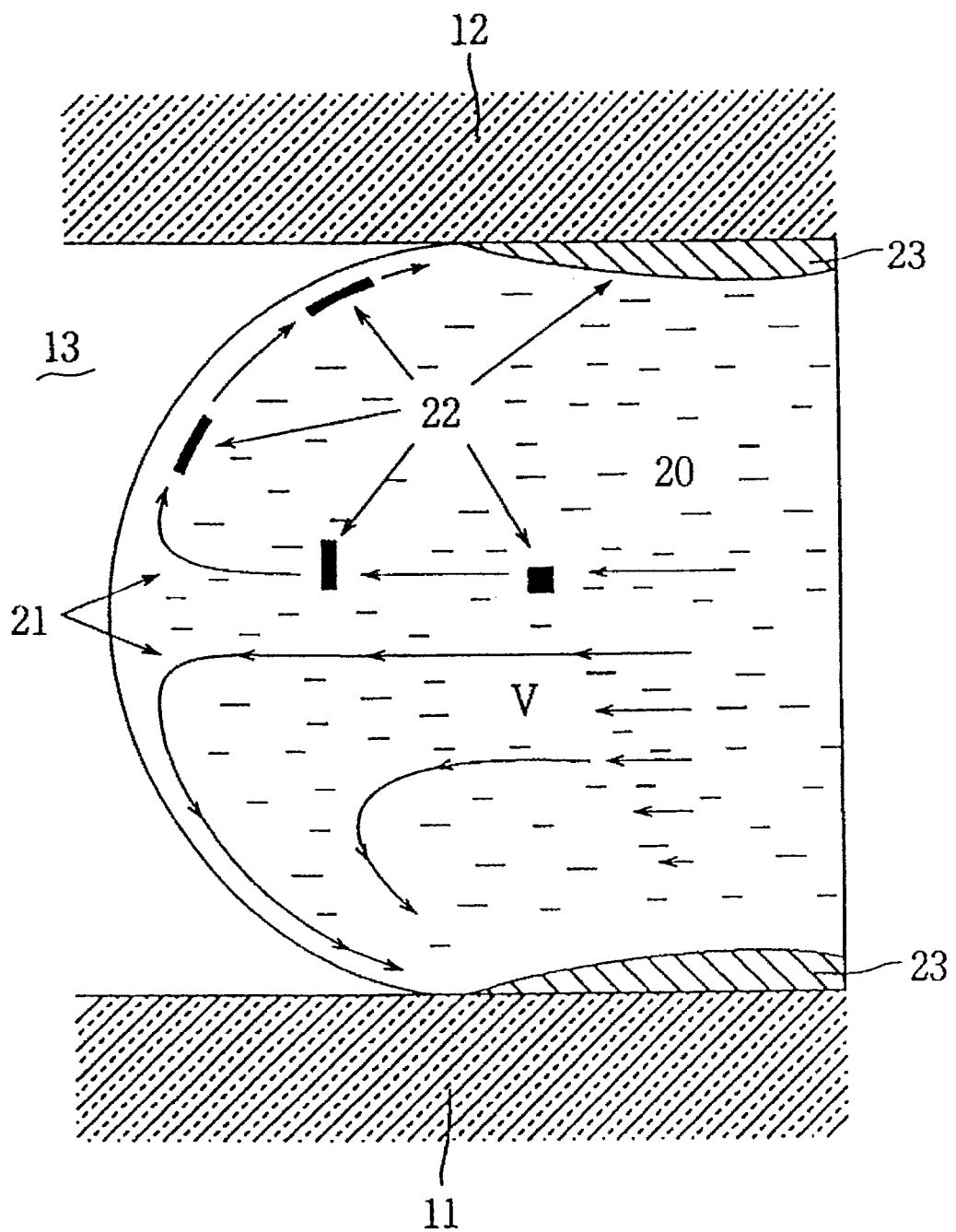
FIG. 1 is a schematic view illustrating the top end of a molten resin flowing in a molding cavity.

According to the present invention, molds 11 and 12 defines a molding cavity 13 corresponding to the profile of a product. The inner surface of the mold 11 for forming the front surface of the product is coated with a heat insulating film 14 excellent in conformability to a molten resin 20, as compared with the inner surface of the other mold 12. Owing to the heat insulating film 14, skin layers 23a and 23b formed on the surfaces of the molten resin 20 in contact with the molds 11 and 12, respectively, exhibits adhesiveness different from each other to the inner surfaces of the molds 11, 12. The difference in said adhesiveness is effectively utilized for the inhibition of sink marks.

The injected molten resin 20 fills the molding cavity 13 between the molds 11, 12, while continuously forming a fountain flow 21 as shown in FIG. 1. The fountain flow 21 has the flow velocity V which becomes higher toward the center of the flow 21, as shown by the distribution of the velocity in FIG. 1. After the molten resin 20 reaches the top end of the effusive flow 21, the molten resin 20 changes its flow direction toward the inner surface of the molds 11, 12. Due to said fluidization, the molten resin 20 is cooled and solidified in the orientated state that the molten resin 20 is elongated along the inner surfaces of the molds 11, 12. Thus, the skin layers 23a, 23b are formed in contact with the inner surfaces of the molds 11, 12, respectively.

Hereon, the skin layer 23a formed in contact with the inner surface of the mold 11 coated with the heat insulating film 14 is prevented from cooling, until the heat insulating film 14 is saturated with a heat. The skin layer 23a is instantaneously remelted by a heat transmitted from the interior of the molten resin 20, so as to relax the orientation of the resin formed during the fluidization. The heat insulating layer 14 suppresses the inward growth of the skin layer 23a. On this stage, a stress along a direction perpendicular to the inner surface of the mold 11 is not formed by the volumetric shrinkage of the resin 20, so that the skin layer 23a is not affected by the shearing force which would breaks the adhesion of the skin layer 23a to the inner surface of the mold 11.

The skin layer 23a then gradually becomes thicker. Hereon, the orientation of the resin 20 is already relaxed, so that the volumetric shrinkage of the resin selective along a certain direction would not be formed in response to the growth of the skin layer 23a. In addition, there is reduced the shearing force which unfavourably affects on the adhesiveness of the skin layer 23a to the inner surface of the mold 11. Consequently, the skin layer 23a grows inwards while maintaining the excellent adhesiveness to the inner surface of the mold 11.

Figure 2:
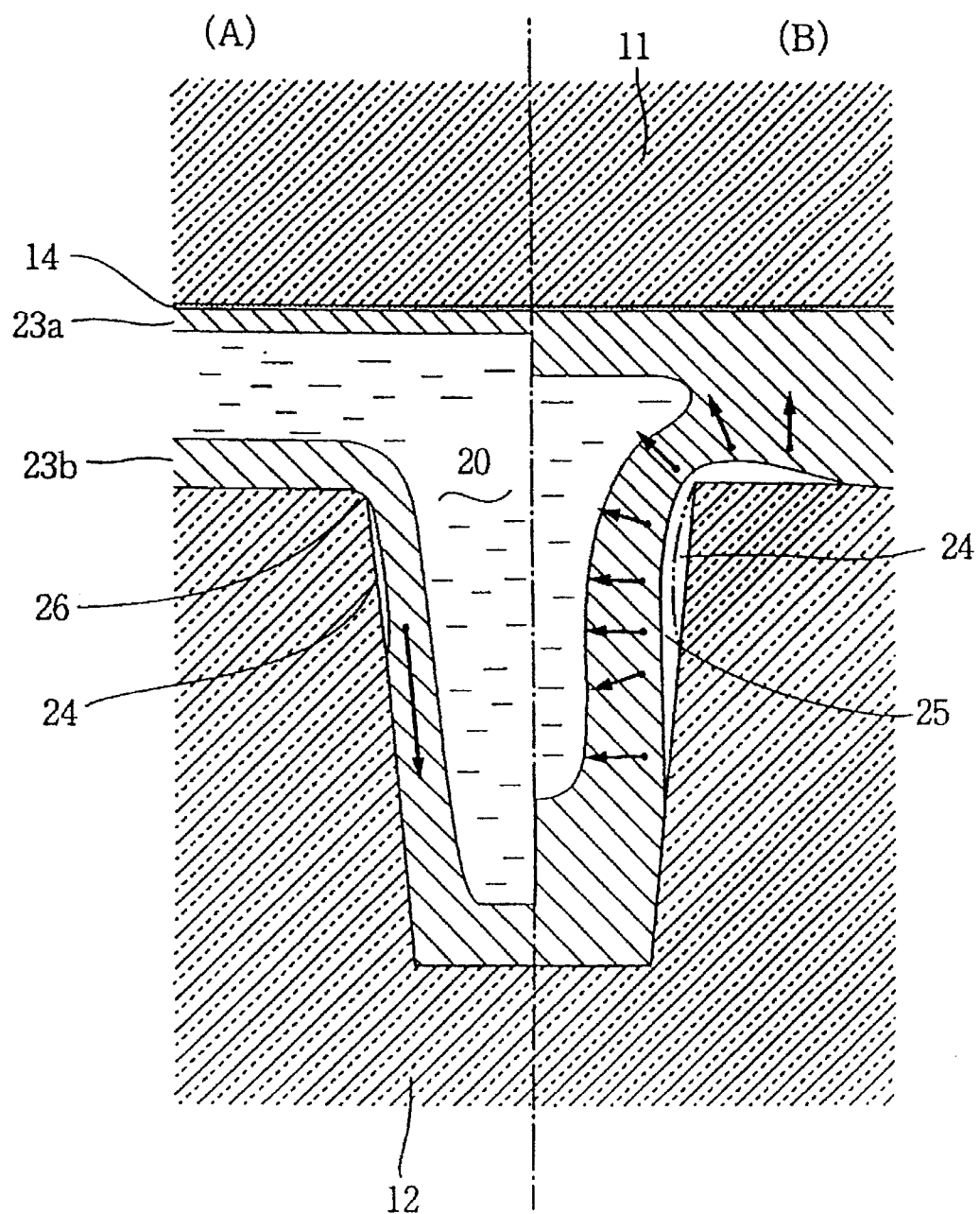
FIG. 2 is a view for explaining the preferential formation of sink marks in the mold asembly wherein a heat insulating film is applied to the inner surface of one mold.

At the side of the other mold 12 uncoated with the heat insulating film 14, the diffusion of a heat from the molten resin 20 through the mold 12 begins at the same time when the injected molten resin 20 stops fluidization. Hereby, the molten resin 20 is rapidly cooled, so that the skin layer 23b becomes thicker on the earlier stage as compared with the skin layer 23a. The skin layer 23b exhibits lower adhesiveness to the inner surface of the mold 12, since the inner surface is not coated with the film 14. A large volumetric shrinkage, i.e. a large negative pressure, is formed in the vicinity of the inner surface of the mold 12 with the growth of the skin layer 23b. The skin layer 23b is easily peeled off the inner surface of the mold 12 by the negative pressure, so as to form a split space 24 between the skin layer 23b and the inner surface of the mold 12, as shown in FIG. 2 (A). The split space 24 becomes larger, as shown in FIG. 2 (B) compensating for the volumetric shrinkage of the molten resin 20 in response to its cooling and solidification. The skin layer 23b is partially depressed at the part, e.g. near the corner of the mold 12, where the negative pressure is concentrately applied.

The cooling and solidification of the molten resin 20 in contact with the inner surface of the mold 11 is made different from that of the molten resin 20 in contact with the inner surface of the other mold 12, by the application of the heat insulating film 14 to the inner surface of the mold 11 for defining the front surface (external appearance) of a product, as afore-mentioned. Hereby, sink marks and other faults derived from the volumetric shrinkage of the molten resin 20 are preferentially formed at the side of the mold 12. On the other hand, the skin layer 23a at the side of the mold 11 grows thicker inwards while maintaining the excellent adhesiveness to the inner surface of the mold 11. Consequently, an obtained product has a front surface excellent in smoothness because of the accumulation of sink marks in the back side, even if thick wall parts such as ribs and/or bosses are formed at the back side of said product.

The heat insulating film 14 has the effect to eliminate weld lines, too. The skin layer, which was solidified in the orientated state due to the elongation in contact with the inner surface of the mold 11, is remelted by a heat retained in the molten resin 20, until the heat insulating film 14 is thermally saturated. The remelting eliminates the weld lines, which is caused by the solidification of the skin layers in the folded state as such, at the side of the mold 11 only.

An ordinary injection mold assembly has a molding cavity, corresponding to the profile of a product, between a movable mold and a stationary mold. The heat insulating film 14 excellent in wettability and conformability to a molten resin may be formed partially or wholly on the inner surface of either the movable mold or the stationary mold. The thickness of the film 14 may be adjusted in response to the intensiveness to form sink marks. In addition, a protective film or a denatured surface layer may be formed partially or wholly on the inner surface of the other mold, as far as the heat insulating film 14 formed on the inner surface of the mold for defining the front surface of a product has conformability and a heat insulating power superior to those of said protective film or denatured surface layer.

The heat insulating film 14 necessarily has the specified heat insulating power to obtain a preferable heat insulating effect taking into consideration a molding cycle. The heat insulating power may be represented by the coefficient of a quantity of heat transmission, i.e. the value K/R wherein K is the thermal conductivity (cal/cm·sec·° C.) of the material for the heat insulating film and R is the thickness (cm) of the heat insulating film. As the coefficient of a quantity of heat transmission is smaller, the heat insulating film exhibits a larger heat insulating effect.

According to the present invention, the coefficient of a quantity of heat transmission is preferebaly controlled within the range of 0.03–0.5 cal/sec·° C.·cm². If the coefficient of a quantity of heat transmission is below 0.03 cal/sec·° C.·cm², a quantity of heat transmission is too small due to the excessive heat insulating power of the film. In this case, the molding cycle would be farily long. If the coefficient of a quantity of heat transmision exceeds 0.5 cal/sec·° C.·cm², the heat insulating power of the film is too small to suppress the formation of sink marks.

The heat insulating film necessarily has heat resistance at the temperature Of a molten thermoplastic resin to be injection molded as well as excellent wettability to the molten resin. The wettability to the molten resin may be represented by an angle of contact with water (hereinafter referred to as "a contact angle") and measured by a contact angle meter available on the market.

The heat insulating film has a contact angle within the range of 40–95 degrees, preferably 70–90 degrees. The contact angle within said range is similar to the contact angle (i.e. 70–95 degrees) of a general thermoplastic resin. Hence, the heat insulating film has good conformability, i.e. wettability, to a thermoplastic resin to be injected. If the surface of the film has a contact angle below 40 degrees, the adhesiveness of the resin to the film is too strong. In this case, it would be difficult to separate a molded product from the molds. If the contact angle exceeds 95 degrees, the adhesiveness of the resin to the mold is poor. In this case, there would often occur slippings between the skin layer and the film, so as to adversely promotes the formation of sink marks. In actual, we recognized the phenomenon that sink marks were frequently formed, when the inner surface of the mold was coated with a fluoro-resin having an excellent heat insulating power and an excessively high contact angle above 105 degrees.

The other mold corresponding to the back side of a product is made of steel excellent in thermal conductivity. The inner surface of the mold may be coated with a fluoro-resin, as far as the thermal conductivity is not impeded. A denatured surface layer may be formed on the inner surface of the mold by nitriding or the like.

A material suitable for forming the heat insulating film having heat resistance at the temperature of a molten thermoplastic resin to be injection molded as well as satisfying the requisitions of the heat insulating efficiency and wettability as afore-mentioned may be one or more of polyimide resins, e.g. aromatic thermosetting polyimide, type-bismaleimide thermosettingpolyimide, polyether imide, polyamide imide or aromatic polyimide, and other heat resistant high-molecular resins, e.g. polyallylate, polysulfonate, polyether sulfonate, polyphenylene sulfide, polyether ether ketone, polyoxybenzoil copolymer or polyphenylene ether. Among the rest, the polyimide resin is the most suitablematerial for the heat insulating film excellent in heat resistance, endurability and smoothness.

Any of the afore-mentioned heat resistant high-molecular resins has a contact angle within the range of 70–95 degrees and a thermal conductivity within the range of $3-9 \times 10^4$ cal/sec·cm·° C. In order to form the heat insulating film having the coefficient of a quantity of heat transmission within the range of 0.03–0.5 cal/sec·° C.·cm² from such a resin, said heat insulating film preferably has a thickness of 50–300 μm taking into consideration its strength. If the film is thinner than 50 μm, the heat insulating power of the formed film would be too small to sufficiently inhibit the formation of sink marks or weld lines. If the thickness exceeds 300 μm, the heat insulating power of the film would be too high. Hereby, a quantity of heat transmitted to the mold would be too small, so that a molding cycle would be elongated.

The heat resistant high-molecular resin may be applied to the inner surface of the mold for definining the front surface of a product, by spray coating, fluidization dipping, electrodeposition coating, flame spraying, vapor deposition polymerizing, and so on. Especially, the vapor deposition polymerizing method for forming a high-molecular film from a monomer has the advantage that a heat insulating film suitable for practical use can be uniformly formed on the inner surface of a mold in a single step, as compared with the other method which needs the repetition of spraying a monomer solution and polymerizing the monomer with heat to form a heat insulating film having a predetermined thickness.

The heat insulating film may be made of ceramics, e.g. alumina, zirconia, titanium oxide or aluminum titanate, instead of the heat resistant high-molecular resin. Each ceramics may be used in a single or mixed state to form the film. The ceramics may be applied to the inner surface of the mold by spraying, plasma jet, ion plating and so on.

Any of said ceramics have thermal conductivity of 0.005–0.04 cal/sec·cm·° C. at a temperature near 100° C. The calculated thickness of a heat insulating film made of said ceramics is100–1700 μm, in order to obtain the film having the coefficient of a quantity of heat transmission within the range of 0.03–0.5cal/sec·° C.·cm². However, the ceramics film is preferably of 800–1200 μm in thickness, taking into consideration the effect on a molding cycle and the strength of the film.

The heat insulating film may be the composite of ceramics with a heat resistant high-molecular resin. For instance, the ceramics may be compounded with the high-molecular resin by forming a porous ceramics layer on the inner surface of the mold and then impregnating said ceramics layer with the high-molecular resin.

In case where the formed heat insulating film seems inferior in endurability, smoothness or the like, the film may be further coated with a metallic film having a thermal conductivity of 0.3cal/cm·sec·° C. or less and a contact angle of 40–95 degrees. The metallic film is preferably of 0.1–50 μm in thickness. As the metallic film is thinner, the effect of the top-coating is better in general. If the metallic film has a thickness below 0.1 μm, it would be inferior in strength. On the other hand, the metallic film having thickness above 50 μm would excessively promote heat tranmission due to its large thermal conductivity, so as to reduce the effect of the heat insulating film on the inhibition of sink marks.

Almost all thermoplastic resins may be used for the injection molding according to the present invention to inhibit the formation of sink marks. The thermoplastic resin may be polystyrene, rubber-modified polystyrene, AS resin, ABS resin, polypropylene, polyethylene, vinyl chloride resin, polycarbonate resin and so on. A thermoplatic resin containing a reinforcement filler may be injection molded to a product having a front surface free from sink marks.

EXAMPLE 1

Figure 3:
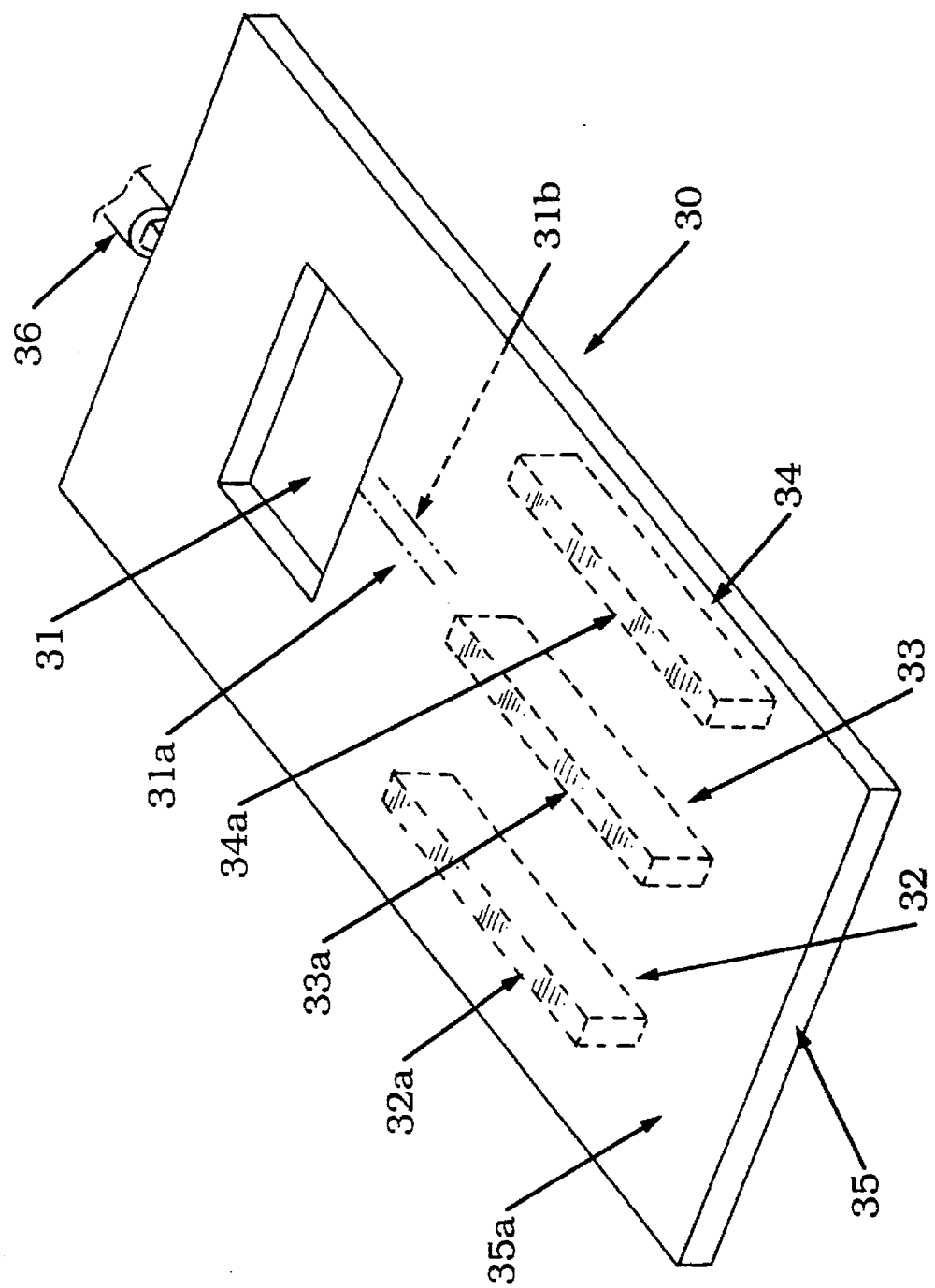
FIG. 3 is the perspective view of a product obtained in Example 1.
Figure 4:
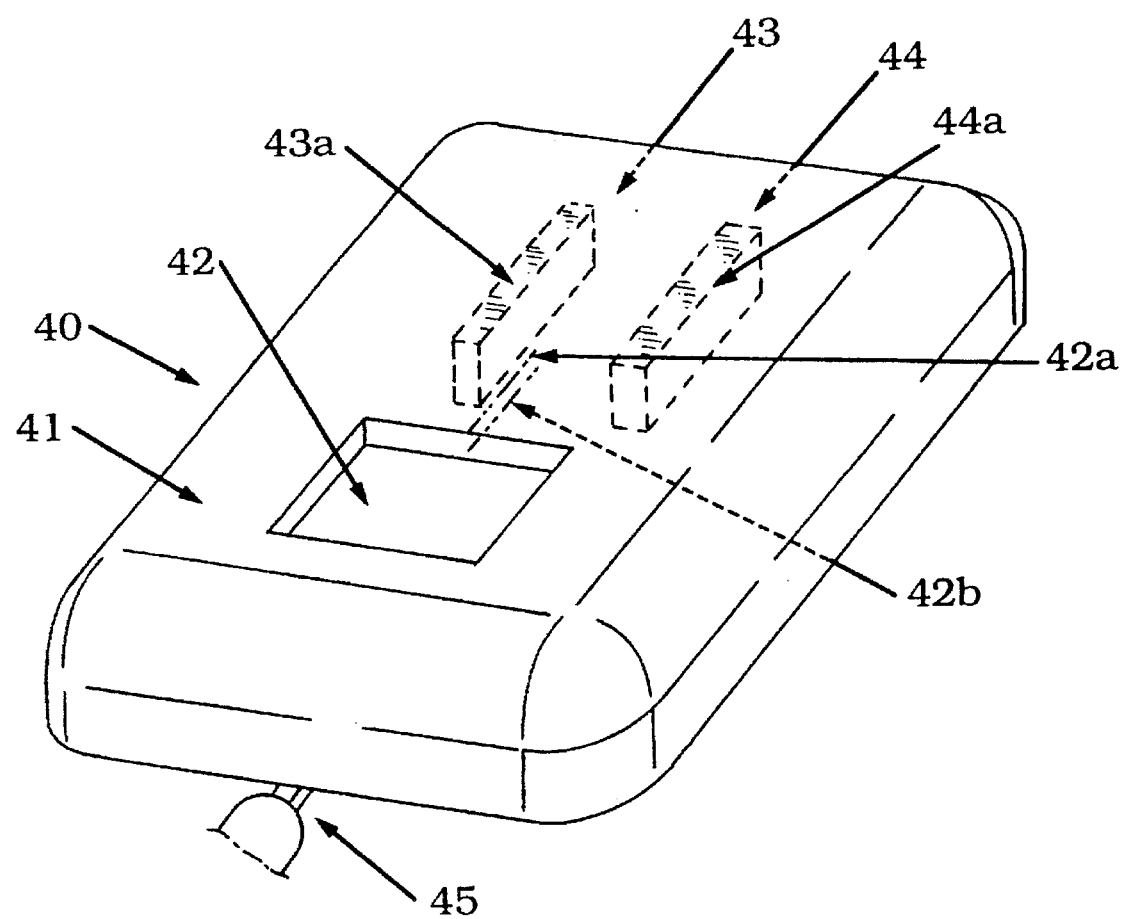
FIG. 4 is the perspective view of a product obtained in Example 4.

A product 30 having a rectangular opening 31 and a plurality of ribs 32–34, as shown in FIG. 3, was injection molded in this example. The product 30 had a plate 35 of 150 mm in length, 60 mm in width and 2 mm in thickness. The surface 35a of the plate 35 was used as the front surface of the product 30. The opening 31 was of 10 mm in length and 20 mm in width. Each rib 32–34 provided at the back side of the plate 35 was of 4 mm in thickness, 5 mm in height and 30 mm in length. A gate 36 for injecting a molten thermoplastic resin into the cavity of a mold was provided at the side surface of the counter plate 35.

The ribs 32–34 were fairly thicker than the plate 35. Due to the difference in thickness, a product obtained by a conventional injection molding method had the surface appearance that sink marks were distinctly noticed on the front surface of the plate 35 at the positions 32a–34a corresponding to the ribs 32–34. During the filling of the molten resin into the molding cavity, the molten resin injected through the gate 36 was diverged at the upperstream of the opening 31 and joined at the downstream of the opening 31. Weld lines as the trace of the joined resin flow were formed at positions 31a, 31b at the downstream of the opening 31.

Molds made of a prehardened steel were used for the injection molding.

A heat insulating film according to the present invention was applied onto the inner surface of a stationary mold for defining the cavity part corresponding to the side of the front surface 35a, as follows: At first, said inner surface was conditioned rough by sand blasting. A solution prepared by dissolving polyether sulfonate (PES) in N-methyl-2-pyrrolidone was applied onto the inner surface and then heated to form a film of 100 μm in thickness. The obtained PES film had the coefficient of a quantity of heat transmission of 0.04cal/sec·° C.·cm$^2$ and a contact angle of 85 degrees measured at 23° C.

The other mold, i.e. a movable mold, was used as such in the state that its metallic inner surce would be in contact with a molten resin.

The movable mold was clamped with the stationary mold to construct a mold assembly. The mold assembly was heated at 50° C. A molten polystyrene resin held at 210° C. was injected into the cavity of the mold assembly for 1.5 sec.. The resin injected into the cavity was cooled 20 sec., and then the mold assembly was disclamped to take out a molded product 30.

The surface appearance of the obtained product 30 was observed. Any sink marks were not detected at all on the front surface 35a formed in contact with the inner surface of the mold coated with the PES film, at the positions 32a–34a where sink marks would be easily formed due to the difference in thickness. In addition, no weld line was detected at the position 31a where a weld line would be formed in conventional injection molding.

On the other hand, there were noticed sink marks formed on the side surface and the vicinity of the ribs 32–34 at the back side of the product 30 which had been formed in contact with the inner surface of the movable mold uncoated with the PES film. A weld line as the trace of joined resin flows was detected on the back side of the product 30, at the position 31b which was the downstream of the opening 31 with respect to the flowing direction of the resin.

Consequently, it was recognized that surface defects such as sink marks and weld lines were concentrately formed at the back side of the product 30 but not on the front surface 35a. The front surface 35a had a smooth appearance sufficient for use.

COMPARATIVE EXAMPLE 1

The same stationary mold as that in Example 1 was used as such in a polished state without the formation of a heat insulating film. A product 30 was injection molded under the same conditions as those in Example 1.

When the surface appearance of the obtained product was observed, remarkable sink marks were recognized on the front surface 35a at the positions 32a–34a corresponding to the ribs 32–34. On the other hand, there were not formed sink marks at the side surface or the vicinity of the ribs 32–34. The formation of weld lines was distinctly noticed on both the surfaces of the product 30, at the positions 31a, 31b corresponding to the downstream of the opening 31.

COMPARATIVE EXAMPLE 2

The same stationary mold as than in Example 1 was used. After the inner surface of the stationary mold was conditioned rough by sand blasting, a N-methyl-2-pyrrolidone solution of PES was applied to the inner surface and then heat treated to form a film of 7 μm in thickness. The formed PES film had the coefficient of a quantity of heat transmission of 0.57cal/sec·° C.·cm$^2$ and a contact angle of 85 degrees.

The stationary mold was clamped with a movable mold to injection mold a product 30 under the same conditions as those in Example 1.

In the obtained product 30, sink marks were observed on the front surface 35a at the positions 32a–34a, while the side surface and the vicinity of the ribs 32–34 were free from sink marks. In this case, weld lines were detected on both the surfaces of the product at the positions 31a, 31b.

COMPARATIVE EXAMPLE 3

A used stationary mold was the same as that in Example 1. After the inner surface of the stationary mold was conditioned rough by sand blasting, a PES sheet of 1.0 mm in thickness was stuck onto the inner surface of the mold using a N-methyl-2-pyrrolidone solution of PES as a binder. The formed PES film had the coefficient of a quantity of heat transmission of 0.004 cal/sec·° C.·cm$^2$ and a contact angle of 85 degrees.

The stationary mold was clamped with a movable mold to injection mold a product 30 under the same conditions as those in Example 1.

In the obtained product 30, distinct sink marks were not observed on the front surface 35a at the positions 32a–34a, but minute wave-form ruggedness was formed all over the front surface 35a. In this case, weld lines were not detected on the front surface 35a of the product 30 at the position 31a.

EXAMPLE 2

The same stationary mold as that in Example 1 was used. After the inner surface of the mold was conditioned rough by sand blasting, alumina having a thermal conductivity of 0.035 cal/cm·sec·° C. was plasma sprayed onto the inner surface to form a film of 800 μm in thickness. The alumina film was further coated with a Ni film of 20 μm in thickness by electroless plating. The formed film had a thickness of 100 μm in total, the coefficient of a quantity of heat transmission of 0.44cal/sec·° C.·cm² and a contact angle of 90 degrees.

The stationary mold was clamped with a movable mold to injection mold a product 30 under the same conditions as those in Example 1.

In the obtained product 30, any sink marks were not observed on the front surface 35a at the positions 32a–34a. A weld line was slightly formed on the front surface 35a at the position 31a.

On the other hand, sink marks were noticed on the back side of the product 30 at the side surface and the vicinity of the ribs 32–34. A weld line was formed at the position 31b corresponding to the downstream of the opening 31, too.

COMPARATIVE EXAMPLE 4

After the inner surface of a stationary mold was conditioned rough by sand blasting in the same way as that in Example 2, alumina was flame sprayed onto the inner surface of the mold to form an alumina film of 200 μm in thickness. The alumina film was further coated with a Ni film of 20 μm in thickness by electroless plating. The formed film had a thickness of 220 μm in total, the coefficient of a quantity of heat transmission of 1.75cal/sec·° C.·cm² and a contact angle of 90 degrees.

The stationary mold was clamped with a movable mold to injection mold a product 30 under the same conditions as those in Example 1.

The surface appearance of the obtained product 30 was observed. Sink marks were detected on the front surface 35a at the positions 32a–34a, since the film had the large coefficient of a quantity of heat transmission insufficient to exhibit a favourable heat insulating effect. In addition, weld lines were formed on both the surfaces of the product 30 at the positions 31a, 31b corresponding to the downstream of the opening 31.

EXAMPLE 3

After the inner surface of the same stationary mold as that in Example 1 was conditioned rough by sand blasting, a polyimide film was formed on the inner surface as follows: An acid polyamide solution was applied in an amount corresponding to 20 μm in thickness of the polyimide film each step, and then the acid polyamide was dehydratedly ring-opening polymerized with heat. Said application accompanied with heating was repeated until the thickness of the polyimide film reached 200 μm.

When such a laminate film is formed by repeatedly applying the acid polyamide solution, the formed film unavoidably has a rugged surface. In order to eliminate the rugged surface, the surface layer of the polyimide film was machined and polished to adjust the thickness of the film to 100 μm. The polyamide film was not destroyed during machining or polishing, since it was good of machinability. The reformed film had a strength suitable for practical use, the coefficient of a quantity of heat transmission of 0.04 cal/sec·° C.·cm² and a contact angle of 85 degrees.

The stationary mold having the inner surface coated with the polyimide film was clamped with a movable mold to injection mold a product 30 under the same conditions as those in Example 1.

The obtained product 30 had the front surface 35a on which any sink marks were not observed at the positions 32a–34a. No weld lines were detected on the front surface 35a at the position 31a, neither.

On the other hand, sink marks were distinctly observed on the back side of the product 30 at the side surface and the vicinity of the ribs 32–34. A weld line was detected at the position 31b corresponding to the downstream of the opening 31.

EXAMPLE 4

A product 40 obtained in this example had a box-shaped body 41 provided with a rectangular opening 42. Ribs 43, 44 were formed at the back side of the body 41. The body 41 was of 65 mm in length, 60 mm in width, 10 mm in height and 2 mm in thickness. The opening 42 was of 10 mm in length and 15 mm in width. The rib 43 was of 2.5 mm in thickness, 5 mm in height and 30 mm in length, while the rib 44 was of 4.5 mm in thickness, 5 mm in width and 30 mm in length. A gate 45 for injecting a molten resin was formed at the side surface of the body 41.

The ribs 43, 44 were fairly thick as compared with the thickness of the body 41. Due to the difference in thickness, a product 40 obtained by a conventional injection molding method had the counter plate whereon remarkable sink marks were formed on the front surface at the positions 43a, 44a corresponding to the ribs 43, 44. Long weld lines were formed on both the surfaces of the product 40 at the positions 42a, 42b corresponding to the downstream of the opening 42 with respect to the flowing direction of the resin.

The inner surface of a stationary mold for defining the front surface of the product was coated with a heat insulating film according to the present invention, as follows: An acid polyamide solution was applied onto the inner surface in an amount corresponding to 20 μm in thickness of a polyimide film each step, and then the acid polyamide was dehydratedly ring-opening polymerized with heat. The application accompanied with the heating was repeated to form a polyimide film of 200 μm in thickness. The resulting laminate film was machined and polished to adjust its thickness to 200 μm. The obtained film had a strength suitable for practical use, the coefficient of a quantity of heat transmission of 0.04 cal/sec·° C.·cm² and a contact angle of 85 degrees.

The stationary mold having the inner surface coated with the polyimide film was clamped with a movable mold to construct a mold assembly. The mold assembly was heated at 50° C. A molten polystyrene resin held at 210° C. was injected into the cavity of the mold assembly for 1 sec. After the injected resin was cooled as such in the mold assembly for 25 sec., the mold assembly was disclamped to take out the product 40.

When the surface appearance of the obtained product 40 was observed, any sink marks were not detected on the front surface of the product 40 even at the positions 43a, 44a where sink marks would be easily formed in a conventional injection molding method. No weld lines were noticed on the front surface at the position 42a corresponding to the downstream of the opening 42 with respect to the flowing direction of the resin.

On the other hand, remarkable sink marks were formed on the back side of the product 40 at the side surface and the vicinity of the ribs 43, 44. A weld line was observed at the position 42b corresponding to the downstream center of the opening 42.

The mold assembly was repeatedly used for the injection molding of the same polystylene resin. The polyimide film began splitting at a part near the gate 45, when the repetition of injection molding reached approximately 5000 shots.

In order to inhibit the splitting of the film, the inner surface of the stationary mold was precoated with a Cu layer of 20 µm in thickness and then coated with the polyimide film in the same way. The stationary mold prepared in this way was clamped with a movable mold to construct a mold assembly. This mold assembly was useful for the repetition of injection molding over 5000 shots without the splitting of the polyimide film, and a molded product 40 had the accurate profile which would not be deteriorated due to the fatigue of the molds.

EXAMPLE 5

The inner surface of a stationary mold for defining the front surface of a product was coated with the polyimide film of 100 µm in thickness. The polyimide film was formed by vapor deposition polymerization, as follows:

Pyromellitic acid dihydrate (PMDA) and 4,4'-diaminodiphenyl ether (ODA) were simultaneously sublimated in a vapor deposition polymerizing device wherein a stationary mold was preset at a predetermined position. The monomer vapors were polymerizedly deposited as polyamic acid on the inner surface of the mold. The formed polyimide film had a mirror surface excellent in smoothness. Said film was good of uniformity and adhesiveness to the inner surface of the mold.

The stationary mold having the inner surface coated with the polyimide film was clamped with a movable die to construct a mold assembly. A polystylene resin was injected into the molding cavity of the mold assembly under the same conditions as those in Example 4.

When the surface appearance of an obtained product 40 was observed, the counter plate 41 had a smooth surface similar to a mirror. No sink marks were detected on the front surface of the product 40 even at the positions 43a, 44a where sink marks would be easily formed in a conventional injection molding method. Any weld lines were not recognized on the front surface at the position 42a corresponding to the downstream of the opening 42.

On the other hand, sink marks were distinctly noticed on the back side of the product 40 at the side surface and the vicinity of the ribs 43, 44. A weld line was formed at the position 42b corresponding to the downstream center of the opening 42.

The mold assembly was repeatedly used for injection molding the same polystylene resin. The splitting of the polyimide film was not detected at all even after 5000 shots, and the stationary mold kept its inner surface in the same sound state as that before the injection molding.

EXAMPLE 6

Figure 5:
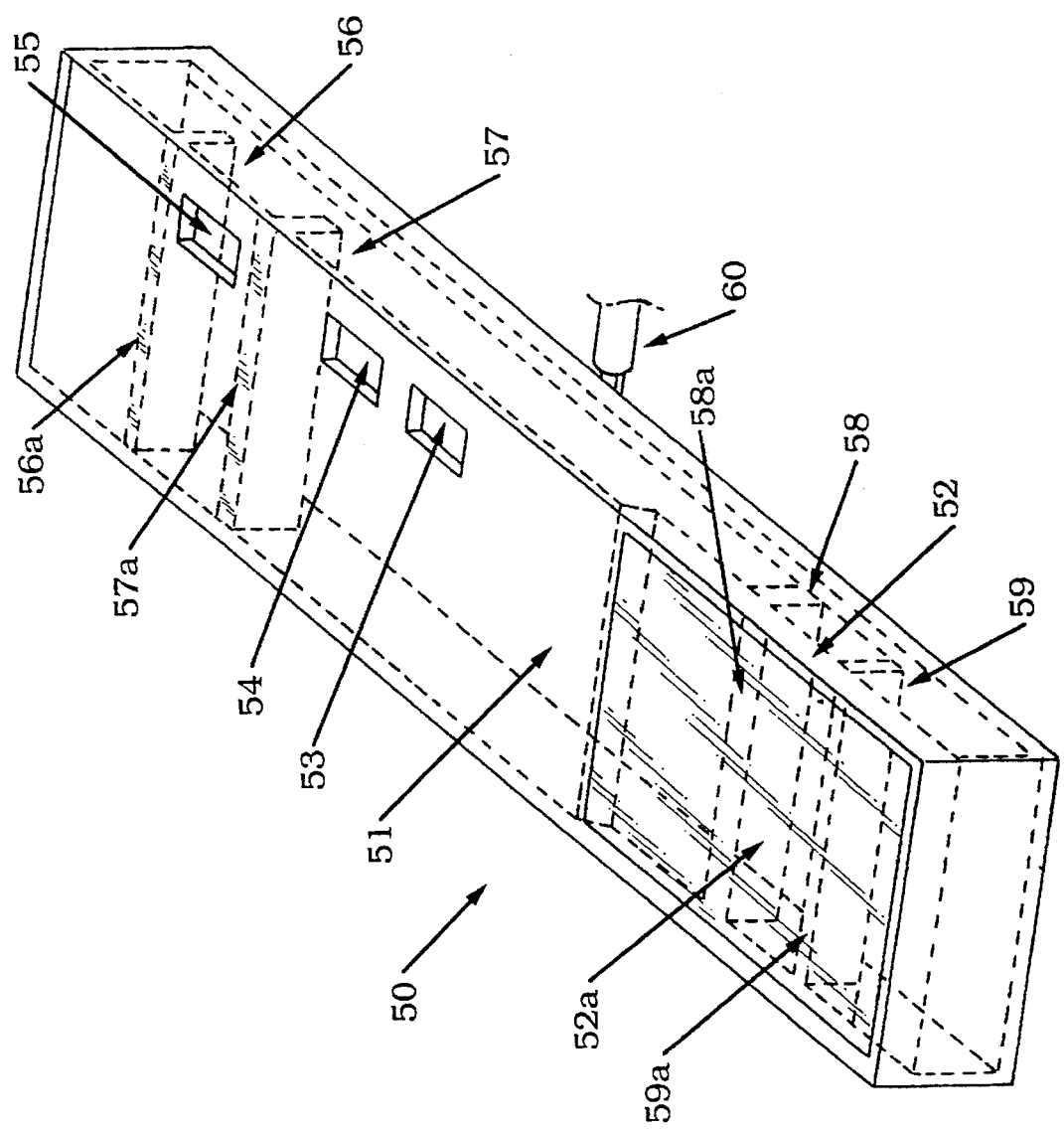
FIG. 5 is the perspective view of a product obtained in Example 6.

A product obtained in this example was shown in FIG. 5. The product 50 had a box-shaped top plate 51 partially formed to a thick part 52. Three rectangular openings 53–55 were formed in the top plate 51. Ribs 56, 57 extending along the whole width of the top plate 51 were formed on the back side of the top plate 51 at its thin part, while other ribs 58, 59 having the same length were formed at the thick part 52. A gate 60 for injecting a thermoplastic resin was provided at the side surface of the product 50.

The product 50 was of 11.5 mm in width, 400 mm in length, 45 mm in height and 2.5 mm in averaged thickness. The thick part 52 of the top plate 51 was of 6.5 mm in thickness. The ribs 56, 59 were of 1 mm in thickness, while the ribs 57, 58 were of 3 mm in thickness.

A polyimide film of 150 µm in thickness was formed on the inner surface of a stationary mold for defining the external appearance of the product 50, by the same vapor deposition polymerizing as that in Example 4.

The stationary mold having the inner surface coated with the polyimide film was clamped with a movable mold to construct a mold assembly. The mold assembly was heated at 50° C. A molten polystyrene resin held at 210° C. was injected into the cavity of the mold assembly for 1.7 sec.. After the injected resin was cooled for 80 sec. as such in the molding cavity, the mold assembly was disclamped to take out a product 50.

When the surface appearance of the obtained product 50 was observed, the front surface of the counter plate 51 formed in contact with the inner surface of the stationary mold coated with the polyimide film was very smooth similar to a mirror. Any sink marks were not recognized at all on the front surface of the counter palte 51, including the surface 52a of the thick part 52, even at the positions 56a–59a where sink marks would be easily formed in a conventional injection molding method. Any weld line was not formed at all on the front surface of the counter plate 51 at the positions corresponding to the downstreams of the openings 53–55 with respect to the flowing direction of the resin.

On the other hand, sink marks were distinctly recognized on the back side of the product 50, which had been formed in contact with the inner metallic surface of the movable mold, at the side surface and the vicinity of the ribs 56–59. Remarkable sink marks were also detected at the thick part 52 near the boundary changing thickness from the counter plate 51. There were noticed a partially irregular surface caused by the shrinkage force of the resin during cooling, especially in the skin layer 23b formed at the root of the thick rib 57 provided at the back side of the counter plate 52. In addition, weld lines were formed on the back side of the product 50 at positions corresponding to the downstreams of the openings 53–55 with respect to the flowing direction of the resin.

The polyimide film was formed on the inner surface of the stationary mold in any of the examples aforementioned. However, the present invention is not limited by these examples. For instance, the other heat insulating films may be used instead of the polyimide film. The heat insulating film may be applied onto the inner surface of a movable mold. The thickness of a heat insulating film may be changed in the manner such that the film is made thicker at the part where surface defects will be formed with high intensity and thinner at the part where surface defects will be formed with low intensity.

The inner surfaces of both the stationary and movable molds may be coated with heat insulating films different in the coefficient of a quantity of heat transmission, a contact angle, thickness and so on, provided that the inner surface of a mold for defining the front surface of a product is coated with a film effective in heat insulating and conformability, while the inner surface of the other mold for defining the back side of the product is coated with a film less effective in heat insulating and conformability.

According to the present invetion as aforementioned, a heat insulating film excellent in wettability and conformability to a resin material to be injected is applied onto the inner surface of either a stationary mold or a movable mold. The heat insulating film differentiates the condition of heat transmission between the stationary and movable molds. The heat insulating film improves the adhesiveness of the resin to the inner surface of the mold and delays the formation of a skin layer. Hereby, the formation of a skin layer and the splitting of the skin layer are relatively promoted at the side of the inner surface of the mold uncoated with the heat insulating film. Consequently, sink marks originated in the volumetric shrinkage of a molten resin during cooling and solidification is selectively absorbed in the deformation of the skin layer preferentially separated from the inner surface of the mold at the back side of a product. As a result, the front surface of the product is prevented from the formation of sink marks which is one of surface defects in a conventional injection molding method, so that the obtained product has a high commercial value.

The heat insulating film exhibits the instantaneous heat insulating effect during the injection of a molten resin to instantaneously remelt a surfacial skin layer in contact with the inner surface of the mold. The remelting promotes the joining of resin flows formed by the divergence of a molten resin injected into a molding cavity. Hence, it is possible to eliminate weld lines caused by the insufficient joining of the resin flows.

Surface defects such as sink marks and weld lines are inhibited only by using the mold which has an inner surface coated with a heat insulating film in combination with the other mold which has an inner surface uncoated with such a film. Said defect inhibiting effect is apparent when the formed film has the coefficient of a quantity of heat transmission, a contact angle and thickness satisfying the conditions defined according to the present invention. Thus, injection molding is performed under the same condisions as those in a conventional method without the necessity of any special equipment, and a molded product having high commercial value is manufatured under ordinary injection molding conditions in an ordinary molding environment.

What is claimed is:

1. An injection molding method for manufacturing a product having an external appearance free from surface defects such as sink marks, comprising the steps of:

forming a heat insulating film partially or wholly on the inner surface of a mold for defining the external appearance of a product, said film having high adhesiveness to a molten resin as compared with the inner surface of the other mold, wherein the heat insulating film has a coefficient of a quantity of heat transmission, equal to a value of heat conductivity of the film divided by a thickness of the film, within a range of 0.03–0.5 cal/sec·°C.·cm$^2$, clamping the mold with the other mold to form a molding cavity, injecting a molten thermoplastic resin into said molding cavity, and cooling and solidifying the injected resin in said molding cavity, whereby the growth of a resin skin layer and the peeling of said skin layer from the inner surface of the mold are delayed at the side of the mold having the inner surface coated with said heat insulating film, while the growth of a resin skin layer and the peeling of said skin layer from the inner surface of the other mold are preferentially promoted at the side of the other mold.

2. The injection molding method according to claim 1 wherein the heat insulating film has an angle of contact with water within a range of 40–95 degrees.

3. The injection molding method according to claim 1, wherein the heat insulating film is formed partially or wholly on the inner surface of a stationary mold.

4. The injection molding method according to claim 1, wherein the heat insulating film is formed partially or wholly on the inner surface of a movable mold.

5. An injection mold assembly comprising a mold having an inner surface, for defining the front surface of a product, coated with a heat insulating film having good conformability to a molten resin and a high heat insulating power, and the other mold having an inner surface inferior in conformability and heat insulation to said heat insulating film, said inner surface corresponding to the back side of a molded product, and wherein the heat insulating film has a coefficient of a quantity of heat transmission, equal to a value of heat conductivity of the film divided by a thickness of the film, within a range of 0.03–0.5 cal/sec·° C.·cm$^2$.

6. The injection mold assembly according to claim 5, wherein the mold is a stationary mold having an inner surface partially or wholly coated with the heat insulating film.

7. The injection mold assembly according to claim 5, wherein the mold is a movable mold having an inner surface partially or wholly coated with the heat insulating film.

8. The injection mold assembly according to claim 5, wherein the other mold is a stationary mold or a movable mold having a metallic inner surface.

9. The injection mold assembly according to claims 5, wherein the other mold is a stationary mold or a movable mold having an inner surface partially or wholly coated with a protective film or a denatured surface layer inferior in adhesiveness and heat insulation to the heat insulating film.

10. An injection mold assembly comprising a mold having an inner surface, for defining the front surface of a product, coated with a heat insulating film having good conformability to a molten resin and a high heat insulating power, and the other mold having an inner surface inferior in conformability and heat insulation to said heat insulating film, said inner surface corresponding to the back side of a molded product, and wherein the heat insulating film has an angle of contact with water within a range of 40–95 degrees.

* * * * *